US 6,604,427 B1

(12) United States Patent
Coleman

(10) Patent No.: US 6,604,427 B1
(45) Date of Patent: Aug. 12, 2003

(54) BELLOW-TYPE PRESSURE SENSING APPARATUS

(76) Inventor: Nate Coleman, 40485-D Murrietta Hot Springs Rd. PMB 349, Murrietta, CA (US) 92563

( * ) Notice: Subject to any disclaimer, the term of this patent is extended or adjusted under 35 U.S.C. 154(b) by 0 days.

(21) Appl. No.: 09/357,056

(22) Filed: Jul. 19, 1999

(51) Int. Cl.[7] ................................................ G01L 7/06
(52) U.S. Cl. ...................................... 73/729.1; 73/705
(58) Field of Search ............................ 73/729.1, 705, 73/715, 722, 730, 728, 701, 723, 386, 387; 92/3; 324/109; 250/231.19, 231.1, 231.11; 340/626

(56) References Cited

U.S. PATENT DOCUMENTS

| | | | | |
|---|---|---|---|---|
| 4,276,776 A | * | 7/1981 | Lapeyre ..................... 73/363.7 |
| 4,329,017 A | * | 5/1982 | Kapany et al. ........... 350/96.15 |
| 4,408,123 A | * | 10/1983 | Sichling et al. ............. 250/226 |
| 4,665,747 A | * | 5/1987 | Muscatell .................... 73/386 |
| 4,768,381 A | * | 9/1988 | Sugimoto ..................... 73/657 |
| 4,924,870 A | | 5/1990 | Wlodarczyk et al. ....... 600/480 |
| 5,065,010 A | | 11/1991 | Knute ................... 250/227.21 |
| 5,107,847 A | | 4/1992 | Knute et al. ................ 600/488 |
| 5,514,153 A | * | 5/1996 | Bonutti ...................... 600/204 |
| 6,277,136 B1 | * | 8/2001 | Bonutti ...................... 600/204 |

\* cited by examiner

*Primary Examiner*—Eric S. McCall
(74) *Attorney, Agent, or Firm*—Steins & Associates, P.C.

(57) ABSTRACT

An Improved Bellow-Type Pressure Sensing Apparatus is disclosed. Also disclosed is, an apparatus that provides increased pressure sensitivity without added cost and complexity in the electronic detector circuitry. The apparatus further is less sensitive to gravity, vibrations or other external influences. It is a still further object that the apparatus be available with curved bellow head, formed with either concave or convex reflective surfaces.

9 Claims, 8 Drawing Sheets

BELLOW-TYPE PRESSURE SENSING APPARATUS

BACKGROUND OF THE INVENTION

1. Field of the Invention

This invention relates generally to pressure sensors and, more specifically, to an Improved Bellows-Type Pressure Sensor.

2. Description of Related Art

The bellows-type pressure sensor is widely used in high sensitivity applications. Essentially, what is involved is a very small bellow that is configured to reflect light onto a detector. When the bellow stretches or contracts in response to a pressure change, the detector will sense a corresponding change in the light intensity.

FIG. 1 is a perspective view of a prior art bellow assembly 10. As can be seen, from its outer dimensions, the bellow assembly 10 comprises a stem 12 from which extends the bellow section 14 which terminates in the head 16. The bellow section 14 is formed somewhat like an accordion, such that the bellow assembly 10 can stretch and shrink in response to changes in external forces. If we now turn to FIG. 2, we can examine the details of how this bellow assembly 10 functions to detect pressure.

FIG. 2 is a partial cutaway side view of the bellow assembly 10 of FIG. 1. Again we can see that the bellow section 14 extends from the stem 12 and terminates in the head 16. In this current embodiment the head 16 comprises a reflector 18 formed on its inner surface. Within the bellow section 14 is conventionally located a light detector 20 mounted on a stand 22. Also found within the bellow section 14 is a light emitter 24. The light emitter is configured to transmit light to the reflector 18 where it is in turn reflected towards the light detector 20. In a conventional bellow assembly pressure detector 10, the light detector 20 is sensitive enough to detect a change in light intensity in response to a change in bellow light 26. It should be noticed that in this conventional design, the reflector 18 has always been substantially flat. As such, the reflective light does not converge in any sort of focal point but instead essentially reflects outward in a Boolean distribution and is spread into a wide area at the depth of the receiver 20; when the reflector moves towards the receiver 20, reflected areas become smaller (in effect focusing the signal). If one imagines that the bellow assembly 10 has an internal pressure$_1$ and the bellow assembly 10 is located within another area at a unknown pressure $P_X$, as $P_X$ is changed, the bellow length 26 will also change until $P_X$ and $P_I$ regain equilibrium. It is this bellow length change 26 that is detected by the detector 20 and converted into an electrical signal for display to the user. FIG. 3 depicts further information about this prior art device.

FIG. 3 is a partial cutaway side view of a conventional bellow-type pressure sensor 30 of the present invention. As can be seen, bellow assembly 10 is typically located within a chamber 28. If we imagine that the bellow assembly 10 is isolated from the chamber 28 and that the chamber 28 includes a sensor tube 32 for sensing an external pressure, we can appreciate that when the sensor tube 32 is placed in a location such that the pressure $P_X$ changes from some reference pressure, and the bellows 10 later extend or contract while the internal pressure $P_1$ seeks to reach equilibrium with the sensed or unknown pressure $P_X$. If we now turn to FIGS. 4A through 4C we can discuss the operation of the prior device more fully.

FIG. 4A is a depiction of the signal path of the bellow assembly 10 of FIGS. 1, 2 and 3. In this simplified drawing, the reflector 18 is shown at a distance $L_{X1}$ from the detector 20. We will assume at this point that $L_{X1}$ defines the at rest condition of the bellow 10. As can be seen, the transmitted light 34 from the transmitter (not shown) strikes the reflector 18 and is reflected back as reflected light 36. As discussed above, it should be understood that substantially all of the transmitted light 34 is returned along the identical path of its arrival 36. Some light however, will scatter as a result of surface irregularities on the reflector 18 and it is this light that is most likely received by the detector 20. If we turn to FIG. 4B we can see that when the sensed pressure changes, the distance between the reflector 18 and the detector 20 changes to $L_{X2}$.

FIG. 4B is a depiction of the device of FIG. 4A after a pressure change has occurred. It should be casually apparent that the reflected light 36 is not substantially changed by the change in the location of the reflector 18. In fact, in order to sense this changed distance, detector 20 must be extremely sensitive (and therefore expensive). Even still, this design will provide a fairly responsive and sensitive pressure detector having a dynamic range in the area of 2 dB. If we now turn to FIG. 4C we can see yet another limitation of the prior sensor.

FIG. 4C is a depiction of the device of FIGS. 4A and 4B when the device is experiencing off-axis deflection. As can well be imagined, the bellow 10 in order to be sensitive, is formed from very thin-walled material. As such, it is affected by external forces including vibrations, gravity and other acceleration and it is common for these external forces to result in an off-axis deflection θy. As can be seen here, while the transmitted light 34 has not changed, when a theoretical deflection θy is caused in the bellow 10, the reflected light 36 tends to be directed away from the detector 20. As such, where the sensor is experiencing vibrations they might actually be sensed as pressure changes but in fact this is not necessarily the case. This, again, adds expense because the detector must be isolated for many external acceleration-type forces.

What is needed therefore, is an improved bellow-type pressure sensor that will increase responsiveness of the detector while reducing the need for an extremely sensitive detector. It would further be desirable if the improved sensor was less sensitive to off-axis deflection.

SUMMARY OF THE INVENTION

In light of the aforementioned problems associated with the prior devices, it is an object of the present invention to provide an Improved Bellow-Type Pressure Sensing Apparatus. It is an object that the improved apparatus provide increased pressure sensitivity without added cost and complexity in the electronic detector circuitry. It is a further object that the apparatus be less sensitive to gravity, vibrations or other external influences. It is a still further object that the apparatus be available with either concave or convex reflective surfaces, or a lens. It is a further object that the signal strength be increased.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Bellow-Type Pressure Sensing Apparatus.

Figure 5:
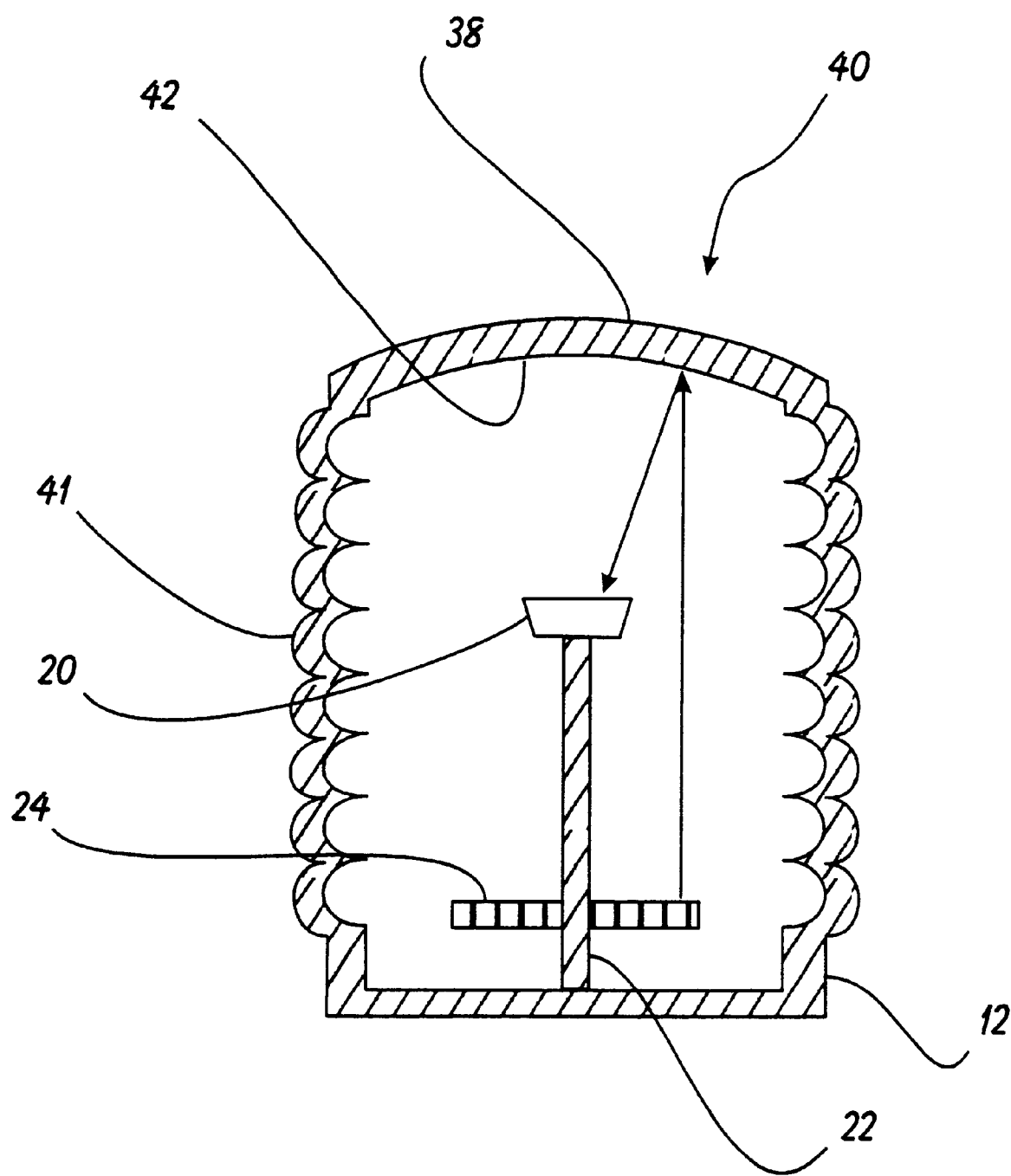
FIG. 5 is a preferred embodiment of the improved bellow type pressure sensor of the present invention.

The present invention can best be understood by initial consideration of FIG. 5. If we now turn to FIG. 5 we can examine the improved bellow-type pressure sensor 40 of the present invention.

FIG. 5 is a preferred embodiment of the improved bellow type pressure sensor 40 of the present invention. As can be seen (and just as with the prior art sensor), the sensor 40 comprises a stem 12 and a detector 20. Unlike the prior unit, however, this bellow assembly 41 comprises a curved head 38, which further forms a curved reflector 42 (known alternatively as focusing means for focusing the transmitted signals).

Figure 6A:
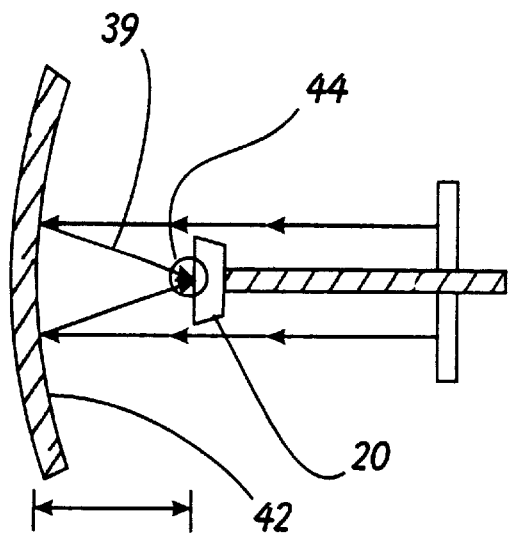
FIG. 6A is a depiction of the light path of the device of FIG. 5.

FIG. 6A is a depiction of the light path of the device of FIG. 5. As can be appreciated and as depicted by FIG. 6A, the curved reflector 42 causes transmitted light 34 to be reflected 39 into a focal point 44. If we imagine that the focal point 44 is the resting focal point (i.e. when the length of the detector 20 is $L_{X1}$) the detector 20 being located in substantially the same location as the resting focal point 44, by design.

Figure 6B:
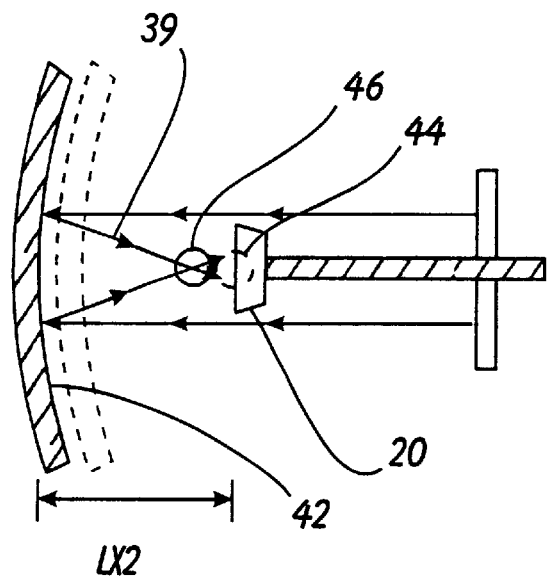
FIG. 6B depicts the light path of the device of FIG. 6A in response to a pressure change.

FIG. 6B depicts the light path of the device of FIG. 6A in response to a pressure change. If, as depicted in FIG. 6B, a pressure change causes the reflector 42 to now move to a distance $L_{X2}$ from the detector 20, it should be understood that the new focal point 46 is in a different location than the resting focal point 44. Since substantially all of the reflected light 39 is passing through the focal point 46, the detector 20 will experience a drastic change in detected light. In fact, the detected light, under certain conditions and designs, could drop to nearly zero intensity. As can be imagined, in such a design, the sensitivity of detector 20 need not be as good as with the prior designs, while still able to achieve substantial benefit in the area of dynamic range. In fact, theoretical response analysis indicates that a bellow assembly 41 having a curved reflector 42 will have many times the intensity response of the prior unit (to at least 20 dB).

Figure 1:
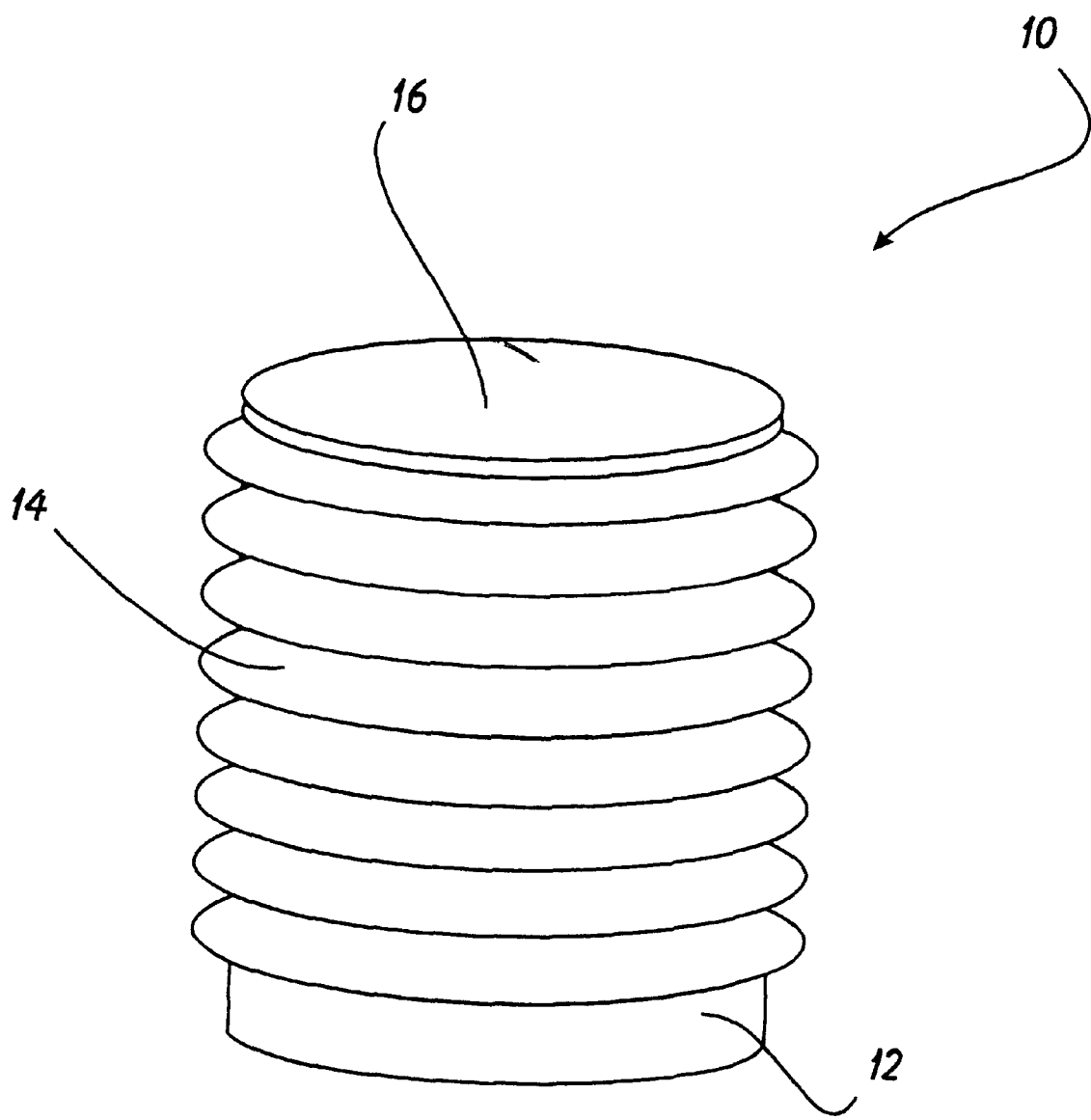
FIG. 1 is a perspective view of a prior art bellow assembly.
Figure 2:
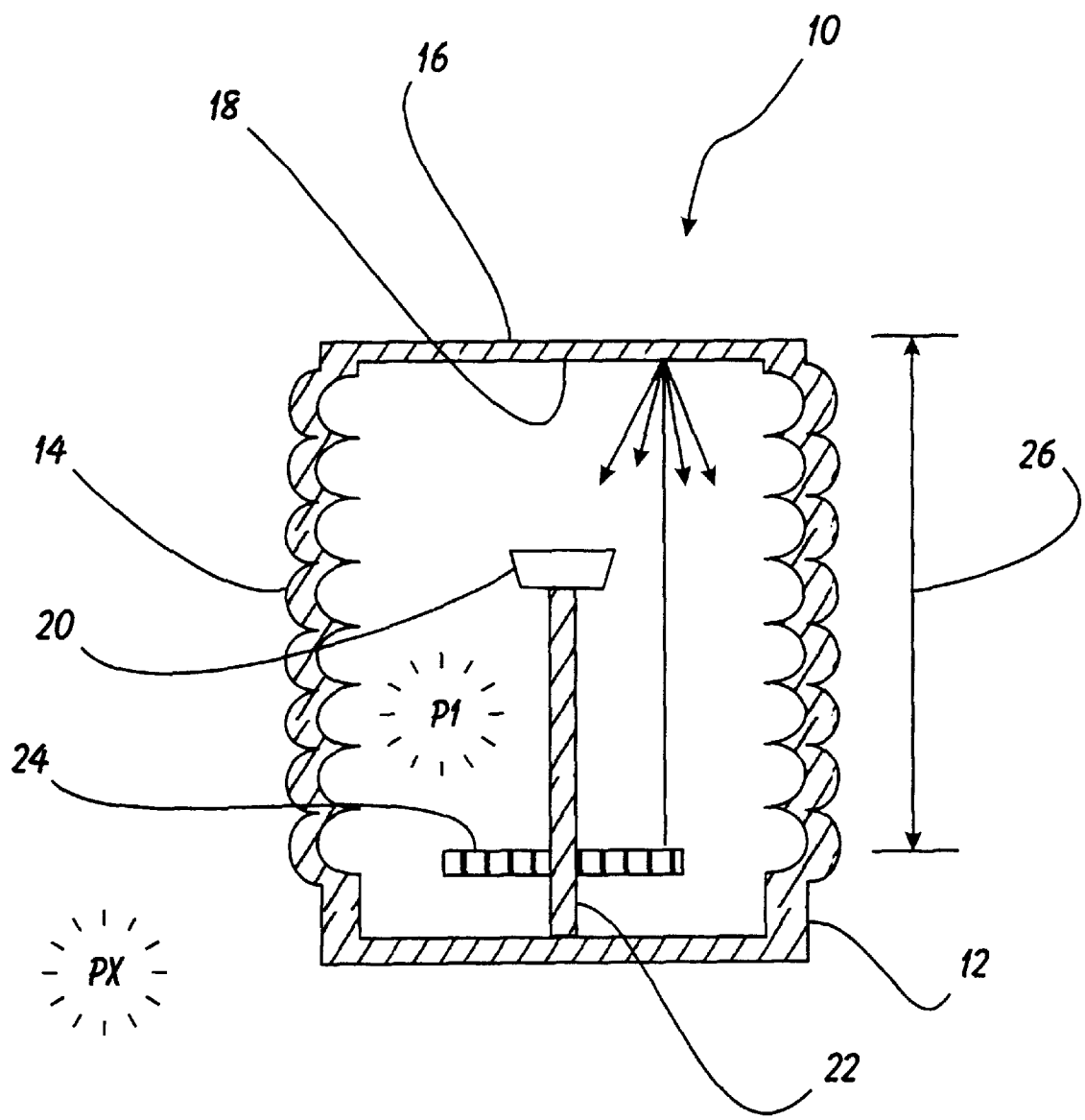
FIG. 2 is a partial cutaway side view of the bellow assembly of FIG. 1.
Figure 3:
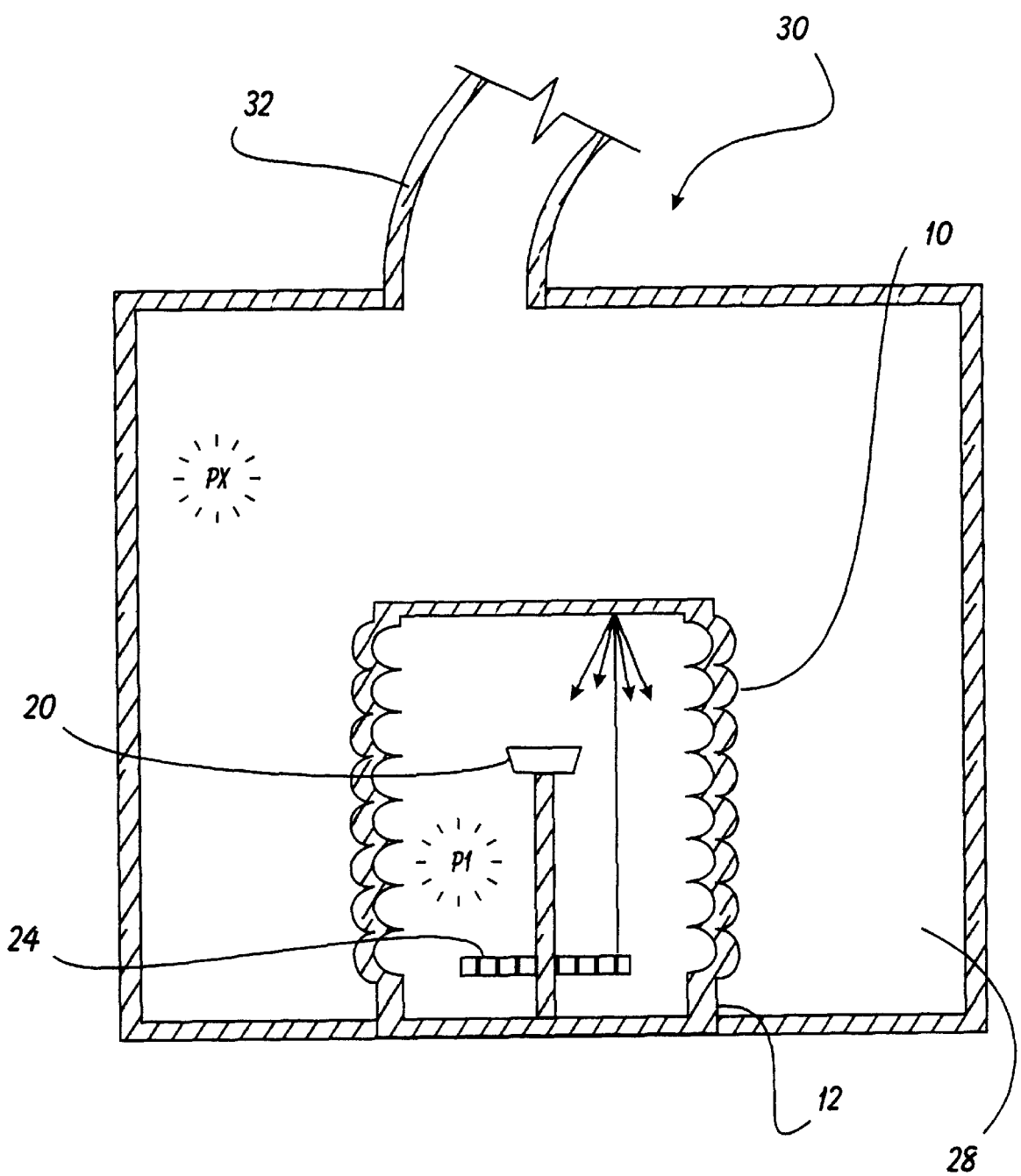
FIG. 3 is a partial cutaway side view of a conventional bellow-type pressure sensor.
Figure 4A:
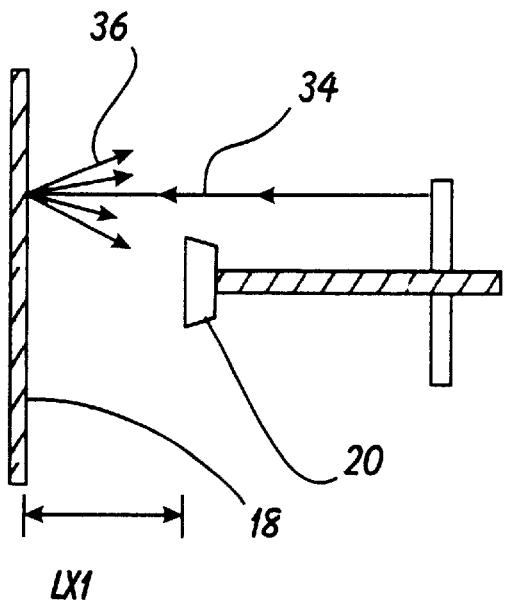
FIG. 4A is a depiction of the signal path of the bellow assembly of FIGS. 1, 2 and 3.
Figure 4B:
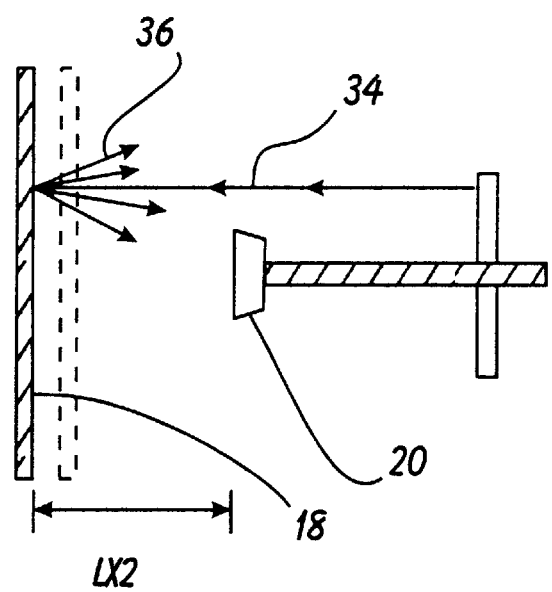
FIG. 4B is a depiction of the device of FIG. 4A after a pressure change has occurred.
Figure 4C:
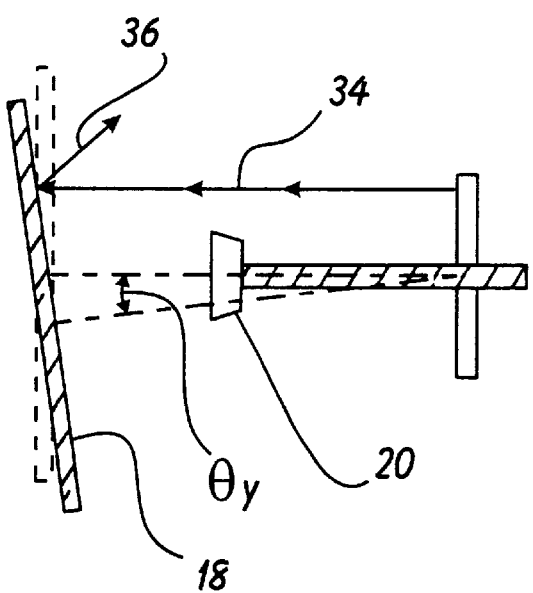
FIG. 4C is a depiction of the device of FIGS. 4A and 4B when the device is experiencing off-axis deflection.
Figure 6C:
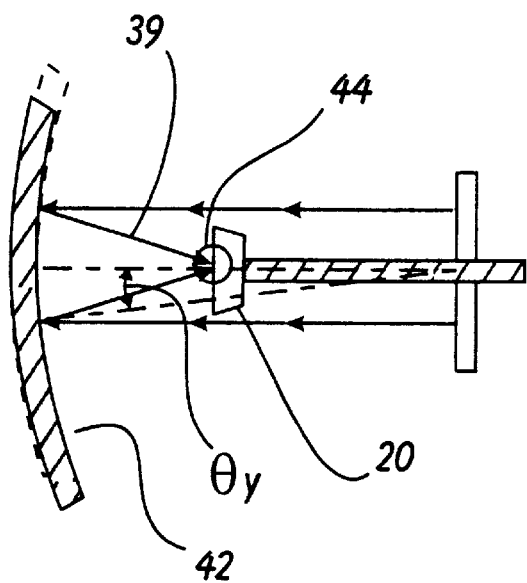
FIG. 6C is a depiction of the light path of the device of FIGS. 6A and 6B when the device is experiencing off-axis deflection.

FIG. 6C is a depiction of the light path of the device of FIGS. 6A and 6B when the device is experiencing off-axis deflection. Furthermore, and as depicted in FIG. 6C, this improved bellow assembly 41 will be much less sensitive to external acceleration and/or other forces. As can be seen, when the reflector 42 experiences off-axis deflection θy just as described above in connection with FIG. 4C, the focal point 44 will be expected to reside in substantially the identical location, so long as the center of mass is made to be close to the focal point, which is a simple design task. As such, the improved bellow-type pressure sensor 40 will be affected much less by bumping or other jarring. If we now turn to FIG. 7 we can see yet another preferred embodiment of the pressure sensor of the present invention 50.

Figure 7:
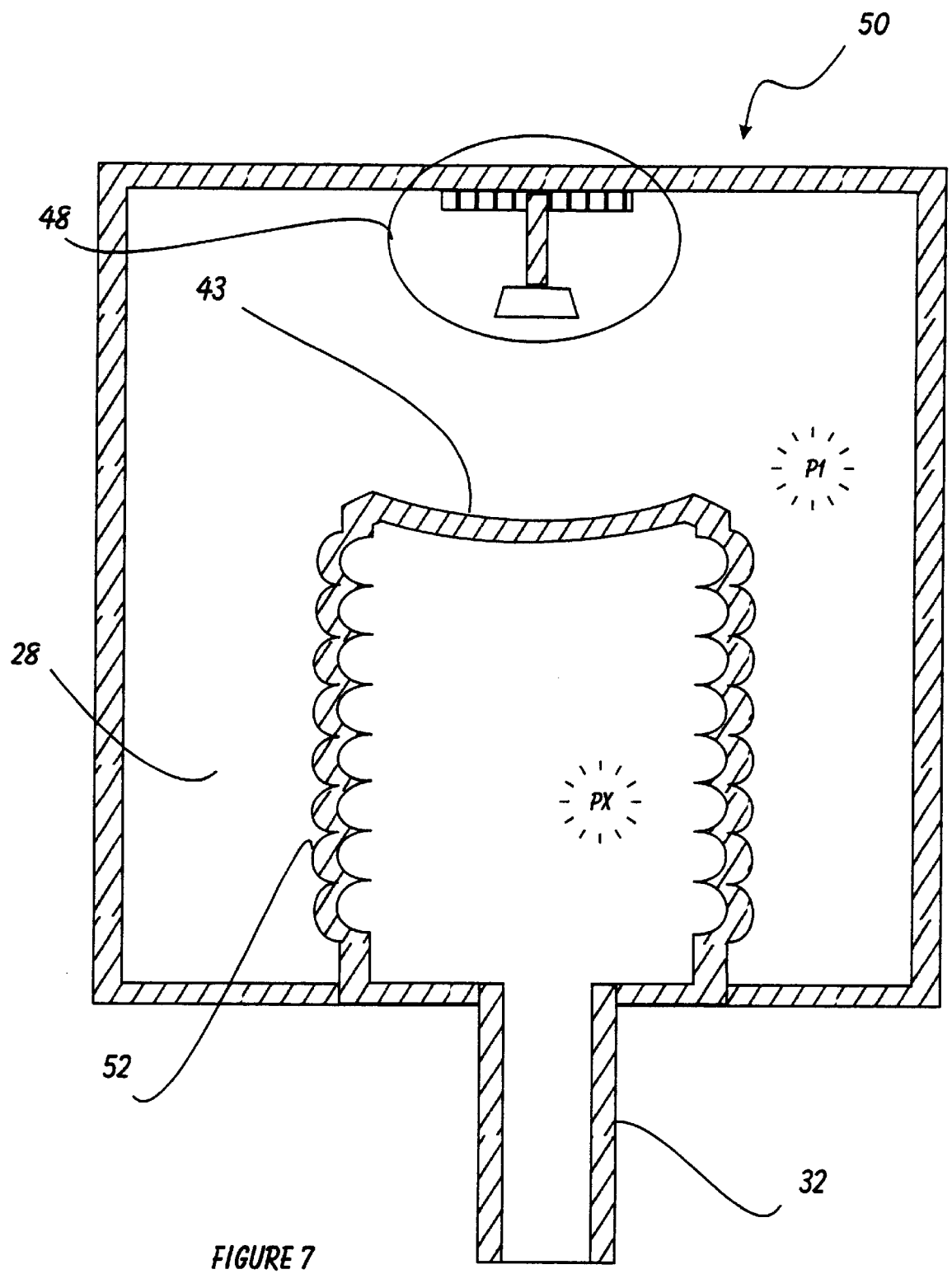
FIG. 7 is an alternate embodiment of the pressure sensor of the present invention having an alternate reflector and a unitary source/detector unit.

FIG. 7 is an alternate embodiment of the pressure sensor of the present invention 50 having an alternate reflector and a unitary source/detector unit 38. As can be seen, the alternate bellows assembly 52 of this design comprises the alternate curved reflector 43 which is, in fact, convex (on its inner surface), in this case, furthermore, the light source and light detector are located in the chamber 28 rather than within the bellow assembly 52. In fact, in this embodiment the detector and source are also found in a single unit 48 attached to the wall of the chamber 28. In this form, the sensor tube 32 is actually in fluid communication with the bellow assembly 52. This design enables the electronics to be external to the bellow, and perhaps be easier to repair. It should be understood, however, that the general operational parameters are likely to be identical to the design discussed above in connection with FIGS. 5 and 6.

Figure 8:
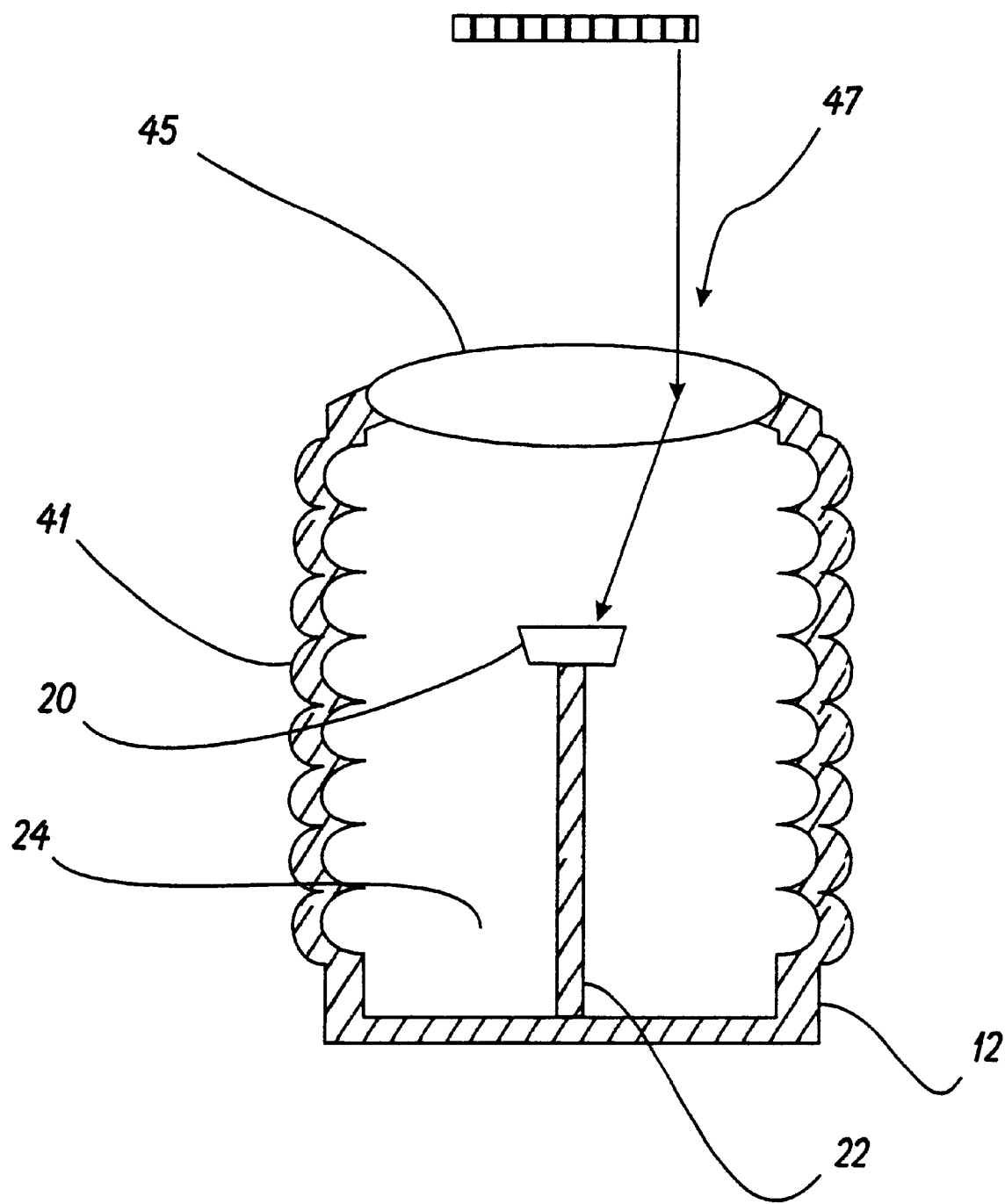
FIG. 8 is yet another alternate embodiment of the pressure sensor of the present invention having a lens unit captured within the head of the bellow assembly.

FIG. 8 is yet another alternate embodiment 47 of the pressure sensor of the present invention having a lens unit (also called a focusing means) captured within the head of the bellow assembly. In this embodiment, the curved head is replaced with a lens unit 45. While the aforementioned benefits in regard to off-axis stability are not achieved, there are substantial improvements in responsiveness over the prior devices.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved pressure sensor, comprising:
   a signal source for transmitting signals;
   a detector for detecting the strength of signals of the type transmitted by said source;
   a bellow assembly, further defining a head, said bellow assembly configured to translate a sensed pressure change into a signal represented by substantially longitudinal travel of said head, said bellow assembly further comprising a stem, a bellow section extending from said stem, and a head adjacent to said bellow section, said head comprising focusing means for reflecting and focusing said transmitted signals and directing them towards said detector, said focusing means comprising a curved reflector for focusing and reflecting said transmitted signals towards said detector, said focusing means located at said head, said signal source and said detector being encapsulated within said bellow;

a chamber within which said bellow assembly is located, said chamber defining a chamber pressure; and said bellow assembly defining a bellow pressure, said bellow assembly further defining a longitudinal length, whereby a change in either said chamber pressure or said bellow pressure will result in a change in said length.

2. The sensor of claim 1, wherein:

said bellow assembly is dependently configured with said chamber to define a resting configuration; and said reflector further defines a focal point, said focal point being substantially at the same location as said detector when said bellow assembly is in said resting condition.

3. The sensor of claim 1, wherein said reflector is concave.

4. The sensor of claim 1, wherein said reflector is convex.

5. An improved pressure sensor, comprising:

a signal source for transmitting signals;

a detector for detecting the strength of signals of the type transmitted by said source; and a bellow assembly, further defining a head, said bellow assembly configured to translate a sensed pressure change into a signal represented by substantially longitudinal travel of said head, said bellow assembly further comprising a focusing means for reflecting and focusing said transmitted signals and directing them towards said detector, said focusing means comprising a lens integrated into said head for focusing said transmitted signals onto said detector, said focusing means located at said head, said signal source and said detector being encapsulated within said bellow.

6. The sensor of claim 1, wherein said detector comprises a receiver section located within said bellow assembly and a detector section located external to said bellow assembly, such that signals received at said receiver section are transmitted for detection at said detector section.

7. The sensor of claim 5, wherein said detector comprises a receiver section located within said bellow assembly and a detector section located external to said bellow assembly, such that signals received at said receiver section are transmitted for detection at said detector section.

8. The sensor of claim 3, wherein said detector comprises a receiver section located within said bellow assembly and a detector section located external to said bellow assembly, such that signals received at said receiver section are transmitted for detection at said detector section.

9. The sensor of claim 4, wherein said detector comprises a receiver section located within said bellow assembly and a detector section located external to said bellow assembly, such that signals received at said receiver section are transmitted for detection at said detector section.

* * * * *